United States Patent [19]

O'Connell, deceased et al.

[11] 4,304,254
[45] Dec. 8, 1981

[54] DUST TRAP VALVE WITH REMOVEABLE DOUBLE-LIFE DOOR AND VALVE SEAT MEMBER

[76] Inventors: Stephen R. O'Connell, deceased, late of Cadyville, N.Y.; Patrick M. O'Connell, executor, Cadyville, N.Y. 12918

[21] Appl. No.: 952,595

[22] Filed: Oct. 18, 1978

[51] Int. Cl.³ .............................................. F16K 43/00
[52] U.S. Cl. ............................... 137/329.02; 137/315; 137/357
[58] Field of Search .............. 137/329, 329.01, 329.02, 137/329.03, 329.04, 329.05, 315; 222/450; 251/357

[56] References Cited

U.S. PATENT DOCUMENTS

| 662,249 | 11/1900 | Cadman | 137/329.02 |
|---|---|---|---|
| 1,006,564 | 10/1911 | Kinsey, Jr. | 137/329.04 |
| 2,596,787 | 5/1952 | Ottinger et al. | 137/329.04 |
| 3,099,286 | 7/1963 | Powers | 137/315 |
| 3,257,045 | 6/1966 | Carpentier | 222/450 |
| 3,474,818 | 10/1969 | Hartman | 137/315 |
| 3,532,320 | 10/1970 | Fisch | 137/329.02 |
| 4,140,149 | 2/1979 | Laignel et al. | 137/329.01 |

*Primary Examiner*—Martin P. Schwadron
*Assistant Examiner*—G. L. Walton
*Attorney, Agent, or Firm*—Watson, Cole, Grindle & Watson

[57] ABSTRACT

A dust valve for the discharge line of a dust collection system includes a removable closet with two wear surfaces and a coacting removable valve door with two wear surfaces mounted within the valve body. Once the coacting wear surfaces on the closet and the door are sufficiently worn that they need replacement, each element can be disconnected from its supporting structure, inverted, and then reconnected to the valve body so as to expose a new wear surface. The useful lives of these elements is thus doubled over conventional single wear surface closets and doors.

10 Claims, 7 Drawing Figures

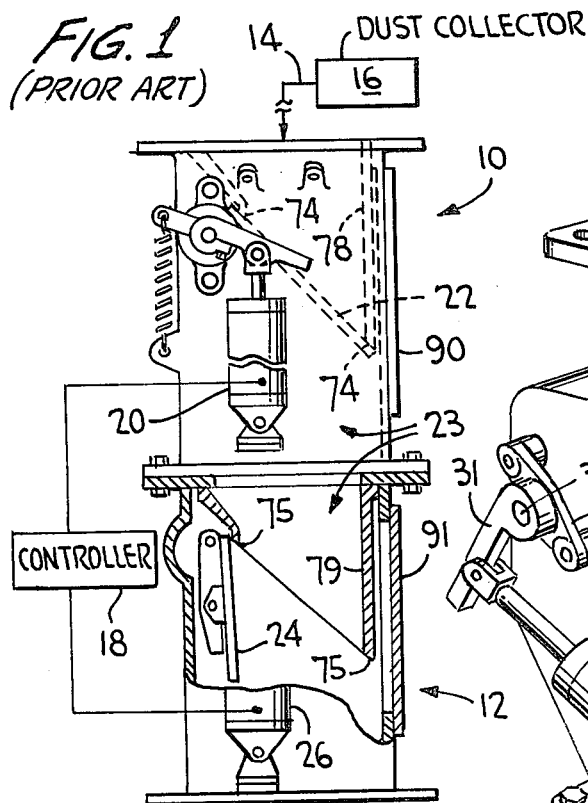
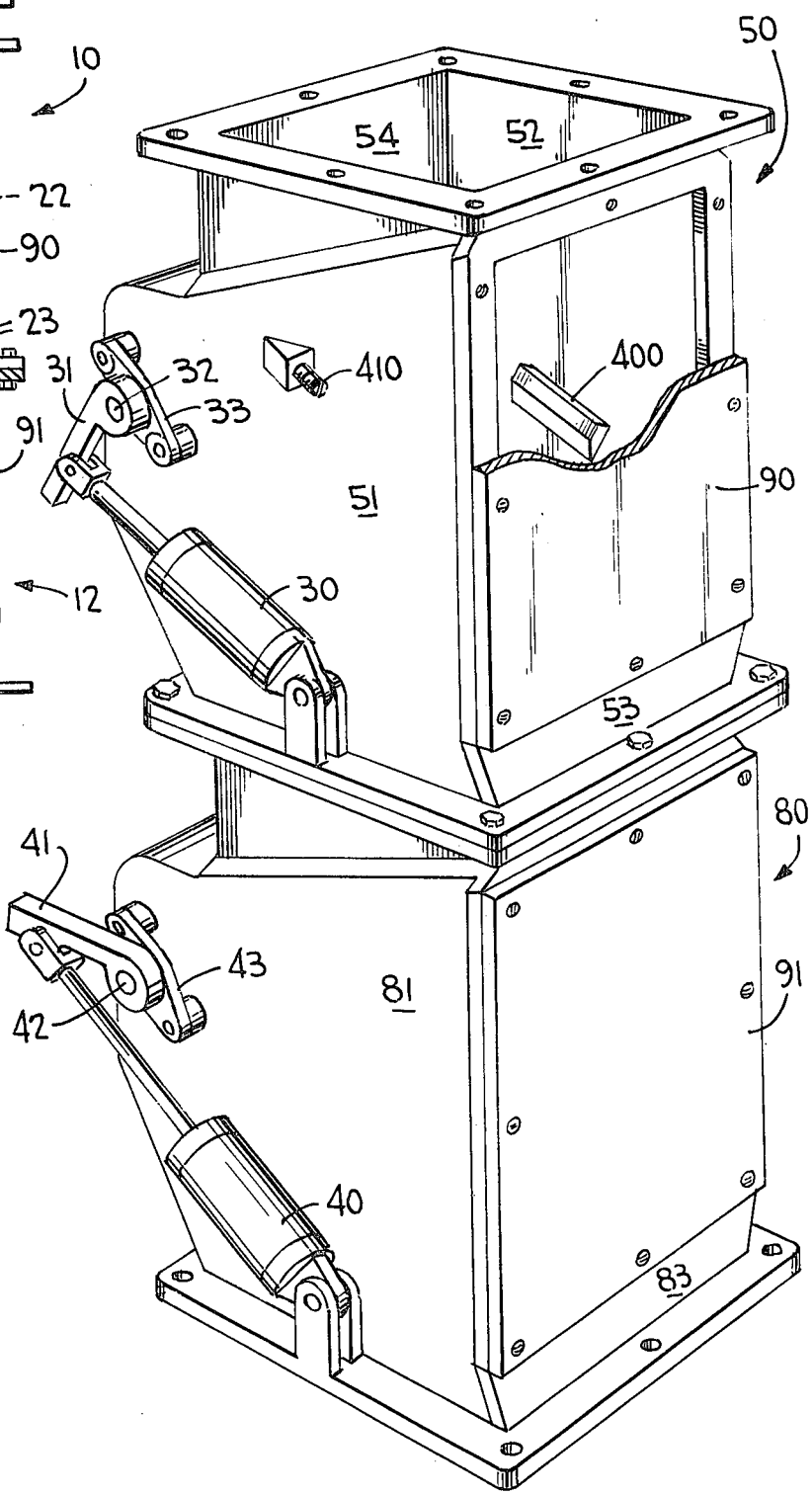

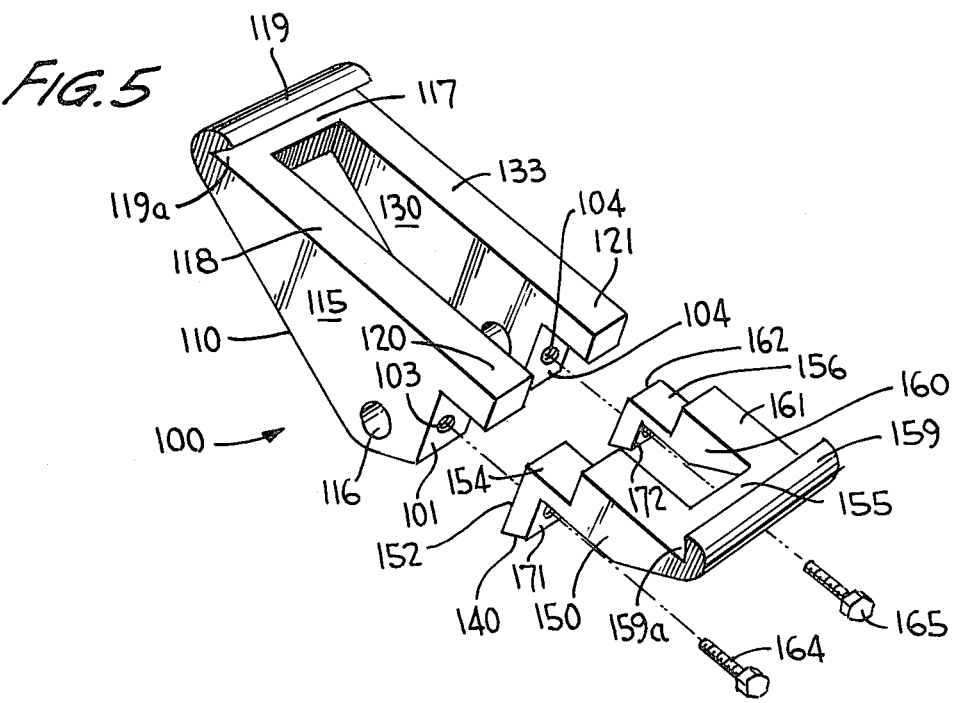
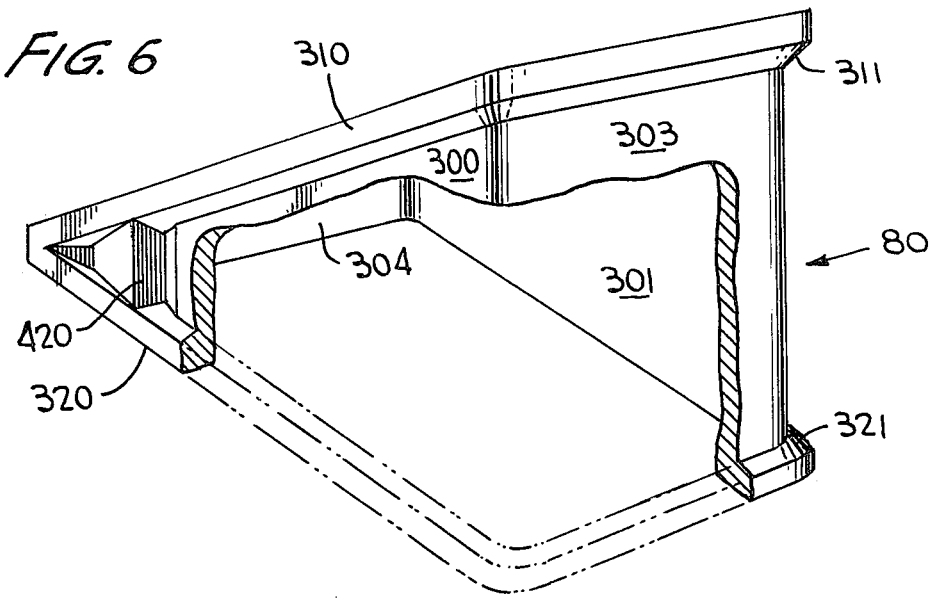

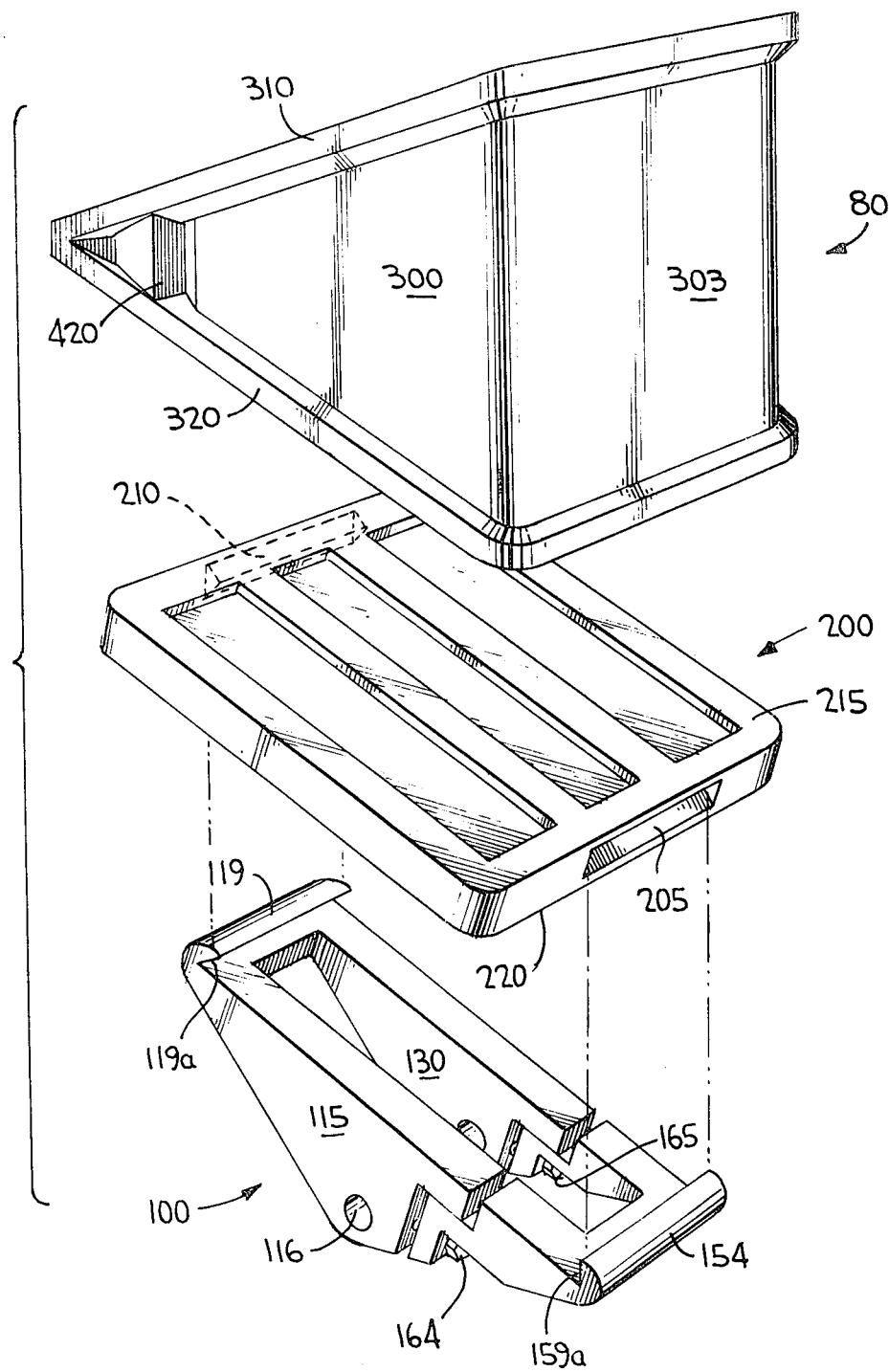

DUST TRAP VALVE WITH REMOVEABLE DOUBLE-LIFE DOOR AND VALVE SEAT MEMBER

BACKGROUND OF THE INVENTION

1. Field of the Invention

The present invention relates to improvements in vacuum dust collection systems which are installed in industrial plants for the removal of dust accumulations, and more specifically to improved dust valves which are utilized as components in the discharge lines of such systems.

2. Description of the Prior Art

Vacuum dust collection systems are widely used in industrial plants where dust accumulations are a reoccurring problem, and for example are regularly installed in iron ore sintering plants, pelletizing plants, stone crushing plants, grain elevators, etc. Such systems conventionally include not only a vacuum-generating means and a dust uptake means, but also a dust discharge line in which are mounted a pair of serially connected dust valves. The dust valves are operable such that the vacuum in the system is never exposed directly to the atmosphere, i.e., the gates within the valve bodies are operated in sequential fashion such that they are never both "open" at the same time.

As is described in detail in Carpentier, U.S. Pat. No. 3,257,045 of June 21, 1966, conventional dust valves used in such vacuum dust collection system discharge lines include internal parts which are subject to wear. More specifically, over long periods of use both the internal valve seat member and the coacting valve flap (door) will become so worn that the sealing engagement therebetween will be no longer obtainable, and this will detract from the operation of the collection system due to vacuum loss. According to this patent the valve seat member is formed as a removable structure (connectable and disconnectable from the supporting structure in the interior of the valve body) and the valve flap (door) may be removable from the supporting valve arm, such that when the valve seat portion of the valve seat member is worn out and/or the coating valve flap is worn out, these structures can be removed from inside of the valve body and replaced. Access to the interior of the valve body is achieved by locating an access opening in one side and then covering this opening with a removable plate which can be sealingly connected to the outside of the valve body by suitable screws (or other fastening means). Thus, by simply removing the plate from the outside of the valve body and illuminating the interior of the valve body through the access opening, a worker can inspect and clean the internal parts and if necessary disconnect, remove and insert a new valve seat member and/or a valve flap. This procedure avoided the wasteful, time consuming and expensive prior art procedures of removing the entire dust valve from the dust collection system discharge line and then either disassembling the valve for replacement of the worn parts or else replacement of the entire valve assembly.

Although the Carpentier dust valves have represented an improvement over earlier valves, the necessity of replacement of the entire valve seat member when the valve seat portion is worn out and/or replacement of the entire dust flap when worn out is a wasteful and expensive procedure, i.e., since much more structure is required to be replaced than simply the portions which wear out.

It is thus an object of the present invention to provide an improved dust valve which utilizes an internal valve seat member and an internal valve door which are not only easily replaceable but which provide a much extended service life as compared to prior art structures.

SUMMARY OF THE INVENTION

According to the present invention either one of or both the valve seat member and the valve door may be fabricated so as to have two usable wear surfaces, and the dust valve body includes appropriate internal supporting structure such that either one of or both the valve seat member and the valve door can be positioned within the valve body so that a wear surface on each element is exposed to sealing engagement with a wear surface on the other element, but which allows for the respectively supported element to be either removed from the valve body for replacement or inverted such that the second wear surface of the respective element is exposed to use.

Further objects, advantages and features of the invention will be apparent in the arrangement and construction of the constituent parts in detail as set forth in the following specification taken together with the accompanying drawings.

DESCRIPTION OF THE DRAWINGS

In the drawings,

FIG. 1 shows a side elevational view, partially in schematic, of a dust collection system incorporating a dust trap wherein a pair of prior art dust valves are shown in accordance with the teachings in U.S. Pat. No. 3,257,045;

FIG. 2 shows a perspective view of a dust trap, partially broken away, in accordance with the present invention, the dust trap incorporating two dust valves;

FIG. 5 shows a perspective view of the valve door holding bracket;

FIG. 6 shows a perspective view of the valve seat member 3, partially broken away; and FIG. 7 shows an exploded perspective view of the operational positioning of the holding bracket, the valve door and the valve door valve closet.

DETAILED DESCRIPTION OF THE PREFERRED EMBODIMENT

Figure 3:
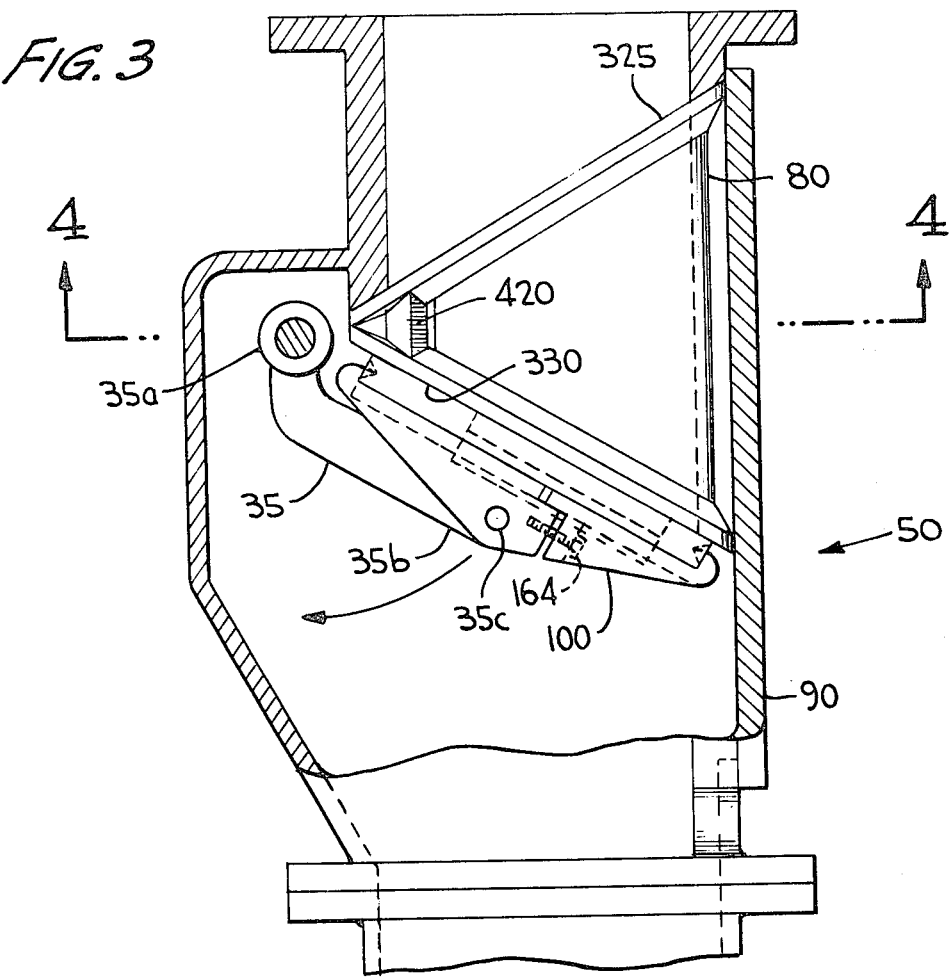
FIG. 3 shows a side elevational view, partially in vertical section, of a single dust valve in accordance with the present invention.
Figure 4:
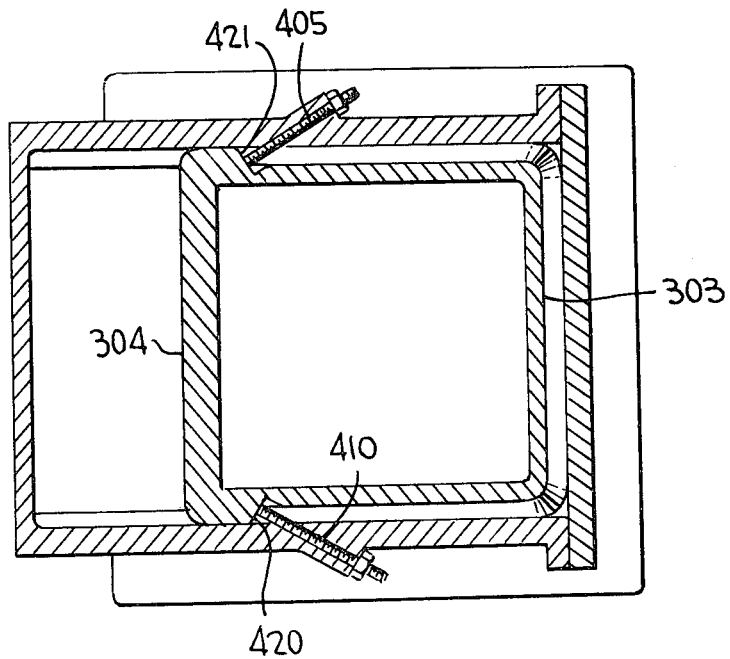
FIG. 4 shows a top view of the dust valve of FIG. 3 along line 4—4.

As is shown in FIG. 1, prior art vacuum dust collection systems which may be advantageously installed in pelletizing plants; iron ore sintering plants; plants producing abrasive materials for industry; gold, silver and copper collection systems, etc; utilize a dust collector system (schematically labeled as 16) which have discharge conduits 14 that are capable of dumping the dust accumulations into the atmosphere. Connected to each conduit 14 are a pair of dust valves 10, 12 which are connected in series and operable such that the valve gates therein are never open at the same time; thus, the vacuum in dust collectors 16 is never allowed to be exposed to the atmosphere. In this regard, pneumatic motors 20 and 26 are controlled by controller 18 such that via suitable linkages gates 22 and 24 will be opened and closed (to thus allow dust to pass through valve seat members 78, 79, respectively) in alternate fashions. Thus, in operation, gate 22 is caused to open (move away from seat portion 74 of valve seat member 78 in a clockwise direction) when dust is to pass from discharge conduit 14 into space 23 (gate 24 being in a closed position, i.e., sealingly engaged against seat portion 75 of valve seat member 79), and once space 23 is filled to the desired level, gate 22 is caused to close (move counterclockwise into sealing engagement with seat portion 74 of valve seat member 78) and thereafter gate 24 is caused to open (move away from seat portion 74 of valve seat member 78 in a clockwise direction). The dust will then be dumped by gravity into the atmosphere.

Both the seat portions of the valve seat members and the flap portions (not shown) of the gates are subject to wear, and periodically require cleaning and/or replacement. For these reasons, access to the interior of the valves is provided by openings in the sides of the valve bodies which are normally covered by plates 90, 91. These plates are normally sealingly connected to the valve body sides by multiple screws or other such fastening means (not shown). The flap portion of the gate is removable and replaceable by disconnection from the supporting arm, and the seat portion of the valve seat member is replaced by removal and replacement of the entire valve seat member.

Turning now to FIG. 2 which shows a perspective view, partially broken away, of a dust trap of the present invention, two dust traps 50 and 80 are shown serially mounted to one another. Pneumatic motors 30 and 40, which are controlled by air pressure from a suitable conventional controller (see 18 in FIG. 1), are connected to respective levers 31 and 41 so as to control the positioning of the valve gates within each respective valve 50 and 80. Such control is achieved via rotational movement of shafts 32 and 42 to which the levers 31 and 41 are respectively connected, the shafts being respectively mounted on brackets 33 and 43 to extend through the side walls 51 and 81 and into the interior of valves 50 and 80. An opening in the front wall 53 and 83 of each valve, sealingly covered by a removable rectangular plate, allows for periodic access into the interior of each valve.

As depicted best in FIG. 3, which for the illustrative purposes shows only a single valve 50, each dust valve according to the present invention includes an actuating arm 35 which at one end includes a collar 35a for connection to a portion of rotatable shaft 32 which extends within the valve 50, and at the other end 35b includes a bore 35c through which a wrist pin (not shown) can be inserted so as to securely attach thereto a holding bracket 100.

Holding bracket 100 is composed of two interconnectable members 110 and 140 (see FIG. 5). Member 110 includes spaced apart elements 115 and 130 which are connected at one end by a bridge element 117, and located at the lower portions of each of the elements 115 and 130 are aligned bores 116 and 131 through which the noted wrist pin is insertable (the end 35b of actuating arm 35 being dimensioned to fit between spaced apart elements 115 and 130). To provide for snug interconnection with member 130, member 110 includes rectangular block extension elements 120 and 121 which respectively extend away from elements 115 and 130, the ends of each extension element comprising a flat surface. Rectangular flat abutment surfaces 101 and 102 on elements 115 and 130, positioned below extension elements 120 and 121, include threaded holes 103 and 104 for the end of adjustment bolts (or screws) 164 and 165.

Member 140 includes spaced apart elements 150 and 160 which are connected at one end by a bridge element 155. The opposed ends include rectangular flat abutment surfaces 152 and 162 which correspond with rectangular abutment surfaces 101 and 102 on member 110, as well as rectangular block indent portions which are dimensioned to correlate with the dimensions of rectangular extension elements 120 and 121. Holes 168 and 169 which extend through the lower portions of elements 150 and 160 are aligned with holes 103 and 104 in elements 115 and 130 to allow bolts 164 and 165 to pass therethrough. Surfaces 171 and 172 provide abutment means for the heads of bolts 164 and 165.

At the opposite ends of members 110 and 140 are attached to bridge elements 117 and 155 are flange members 119 and 159 which extend upwardly of the elements 117 and 155 to a point which overhangs the flat top surfaces of elements 117 and 115, i.e., so as to define acute angular recesses 119a and 159a together with the contiguous top flat surfaces of elements 117, 115, 130, 155, 150 and 160. These flange members act to grip and retain against the flat top surfaces of elements 117, 115, 130, 155, 150 and 160 a suitable door element (to be described below). The door element can be removed by loosening of bolts 164 and 165 and causing a sliding separation of members 110 and 140.

The door element 200 (see FIG. 7) is a rectangular-shaped member which is composed of a wear-resistant material such as Ni metal alloy (an abrasion and heat resistant metal alloy). Two of the opposite sides include V-shaped recesses 205 and 210 which are shaped to correspond with the configuration of flange members 119 and 159 on holding bracket 100, i.e., so as to be gripped thereby and thus fixedly supported on the flat top surfaces of elements 115, 130, 150 and 160 of bracket 100. The door element includes two wear surfaces 215 and 220 which are each separately usable for sealingly engaging with a valve seat portion of a valve seat member as will be described below.

The valve seat member 80 (discussed hereinafter as closet 80) is depicted in FIGS. 3, 4, 5, and 7. It comprises V-shaped side walls 300 and 301, a rectangular front wall 303, a rear connecting beam 304, and flanges 310 and 320 which extend along the top and bottom edges of the side and front walls 300, 301, 303, as well as the rear beam 304 and intersect at the extremities of the V-shaped side walls adjacent the rear connecting beam 304. These flanges have flat exposed sealing surfaces 325 and 330 (see FIG. 3), one of which at any given time functions as the valve seat of the valve 50. These flanges also include supporting lips 311 and 321 (see FIG. 6) for support of the closet within the interior of the valve body. The inside of the closet is hollow so as to allow dust to pass therethrough when mounted within the valve body. The mounting of the closet is achieved by locating the closet within the valve body such that at least a portion of the supporting lip of the lowermost flange is supported by opposed mounting brackets 400 within the interior of the valve body (only one such bracket is shown in FIG. 2) as well as adjustment of opposed set screws 405 and 410 (see FIG. 4) which abut against opposite abutments surfaces 420 and 421 which are formed as part of the closet 80 between the flanges 310 and 320 near their intersection point.

When operating, a dust valve according to the present invention includes a door member 200 mounted on a holding bracket 100 (via engagement of flanges 119 and 159 within recesses 210 and 205, together with abutting contact between members 110 and 140) which sealingly contacts the sealing surface of a flange on closet 80 which is mounted within the valve body (via mounting brackets 400 and tightened set screws 405 and 410). After a long period of use, the wear flange of the closet 80 (either flange 310 or 320 depending on how the closet is positioned within the valve body) will wear such that an uneven surface is formed, and the peripheral wear portion of the door member 200 (the peripheral portion of either the surface 214 or 220) will wear, such that pressure contact between the respective wear surfaces will not result in a sealing engagement. Vacuum loss from the dust collection system will be the undesirable result. With respect to closet 80, set screws 405 and 410 can be unscrewed from contact with abutment surfaces 420 and 421 and the closet 80 lifted off mounting brackets 400 and inverted (such that the other flange becomes the functioning wear surface), and then fixed again in position by positioning on the mounting brackets 400 and retightening of set screws 405 and 410. With respect to door member 100, bolts 164 and 165 can be loosened such that members 110 and 140 are slidingly moved away from one another, door member 200 is turned over, and then fixed again in position by sliding the members 110 and 140 back together with tightening of bolts 164 and 165.

Thus, it can be easily seen that both the closet and the valve door member have twice the useful life of prior art structures.

While there has been shown and described what is considered to be a preferred embodiment of the present invention, it is obvious that various changes and modifications may be made therein without departing from the spirit and scope of the invention as defined in the appended claims.

I claim:

1. In a valve which functions to control the flow of material therethrough, said valve including
   a hollow valve body defined by four interconnected walls including opposed side walls, a front wall and a back wall, said front wall including an access opening therein,
   a plate removably connected to said front wall so as to sealingly cover said access opening,
   a hollow valve seat member removably mounted entirely within said hollow valve body, said valve seat member including a seat portion against which a valve door may be positioned so as to block flow of material through said valve body, and
   a valve door movably mounted within said hollow valve body for positioning against said seat portion of said valve seat member so as to block flow of material through said valve body or away from said seat portion so as to allow flow of material through said valve body,
   the improvement wherein,
   said hollow valve seat member is in the form of a hollow closet which includes V-shaped side walls having top and bottom edges, an interconnecting rectangular front wall having a top and bottom edge, and flanges which extend along the top and bottom edges of said side walls, said front wall and said rear beam, each of said flanges having a flat exposed sealing surface such that the hollow valve seat member will have separate seat portions, said hollow valve seat member being positionable within said hollow valve body such that either of said seat portions is alternatively capable of being contacted by said valve door.

2. The valve of claim 1 wherein each of said flanges include supporting lips for mounting of said closet within said valve body.

3. The valve of claim 2 wherein said valve body includes mounting brackets positioned on the internal sides of said side walls which are cooperable with said supporting lips on said flanges of said closet to mount said closet within said valve body.

4. The valve of claim 3 wherein said closet includes means forming abutment surfaces extending between said flanges on said top and bottom edges of said V-shaped side walls at a point near said rear connecting beam, wherein said side walls of said valve body include threaded holes therein, and wherein screw means are adjustably positionable within said threaded holes so as to extend into the interior of said valve body and contact said abutment surfaces of said closet to fixedly position said closet within said valve body when said closet is mounted upon said mounting brackets.

5. The valve of claim 1 wherein said valve door comprises a rectangular member having top and bottom wear surfaces, said rectangular door member being fixedly supported by a holding bracket means pivotally connected to the side walls of said valve body.

6. The valve of claim 5 wherein said rectangular door includes recesses in opposite sides thereof and wherein said holding bracket means includes clamping means for engagement within said recesses of said rectangular door member.

7. The valve of claim 6 wherein said holding bracket means comprises two slidingly interconnectable members, each of said interconnectable members including a flange member capable of fitting within a respective recess to constitute said clamping means.

8. The valve of claim 7 wherein said slidingly interconnectable members comprise spaced apart members, bridge elements connecting said spaced apart members at their ends opposite the adjacent interconnectable member; wherein said flange members are connected to the respective bridge elements and extend toward one another so as to define acute angled recesses with said adjacent bridge elements and spaced apart elements; wherein one of said spaced apart members of each of said interconnectable members includes threaded holes therein which are aligned with holes in the adjacent interconnectable member; and wherein threaded bolt means are adjustably positioned within said holes to control the positioning between said sliding interconnectable members.

9. The valve of claim 8 wherein said holding bracket means is connected to one end of an actuating arm which is pivotally connected at its other end to the sides of said valve body.

10. In a valve which functions to control the flow of material therethrough, said valve including
    a hollow valve body defined by four interconnected walls including opposed side walls, a front wall and a back wall, said front wall including an access opening therein,
    a plate removably connected to said front wall so as to sealingly cover said access opening,
    a hollow valve seat member removably mounted within said hollow valve body, said valve seat member including a seat portion against which a valve body may be positioned so as to block flow of material through said valve body, and a valve door movably mounted within said hollow valve body for positioning against said seat portion of said valve seat member so as to block flow of material through said valve body or away from said seat portion so as to allow flow of material through said valve body, the improvement wherein, said valve door comprises a rectangular member having top and bottom wear surfaces, said rectangular door member including recesses in opposite sides thereof, wherein a holding bracket means is pivotally connected to said valve body, said holding bracket means including clamping means for engagement within said recesses of said rectangular door member, such that said door member may be clamped to said holding bracket means such that either the top or bottom wear surfaces may be positioned against the seat portion of said valve seat member.

* * * * *